March 19, 1935.  G. C. CLARK  1,994,570
APPARATUS FOR MOLDING HOLLOW METAL ARTICLES
Filed Feb. 3, 1934  4 Sheets-Sheet 1
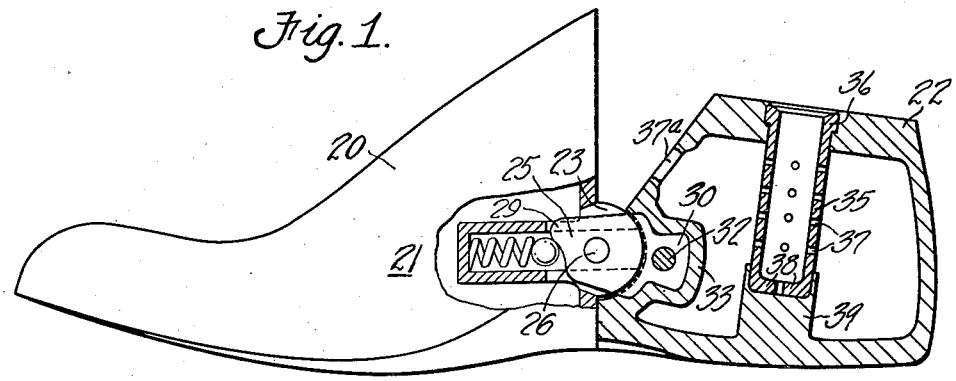
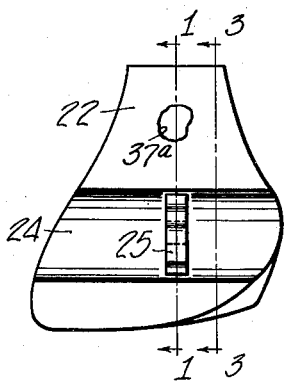
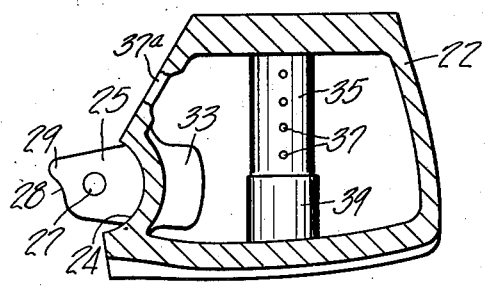
INVENTOR.
George C. Clark.
BY
ATTORNEY.

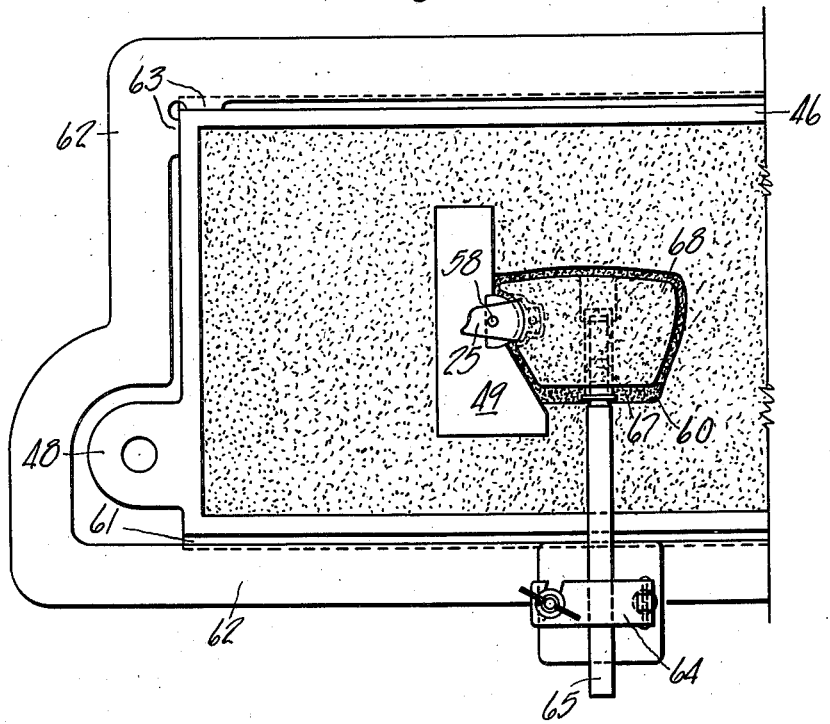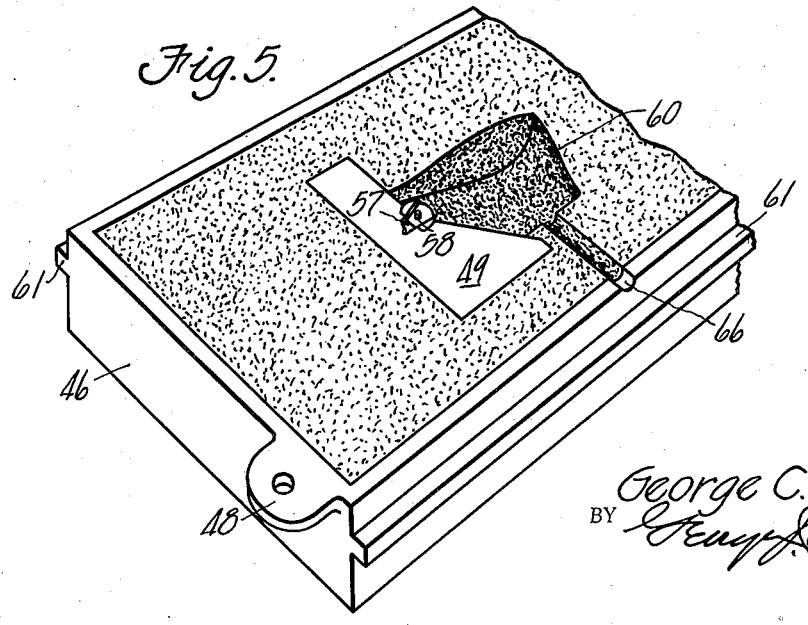

March 19, 1935. G. C. CLARK 1,994,570
APPARATUS FOR MOLDING HOLLOW METAL ARTICLES
Filed Feb. 3, 1934 4 Sheets-Sheet 3
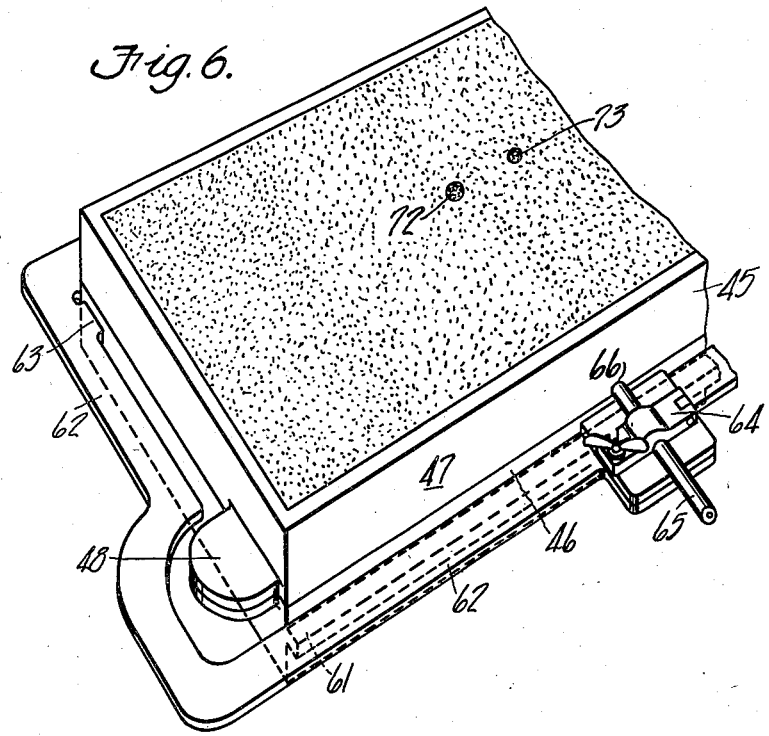
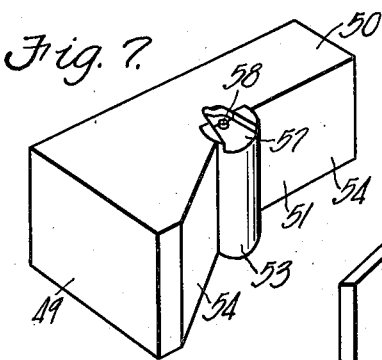
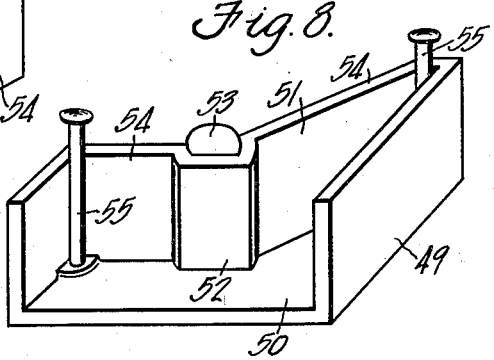
INVENTOR.
George C. Clark.
BY
ATTORNEY.

March 19, 1935. G. C. CLARK 1,994,570
APPARATUS FOR MOLDING HOLLOW METAL ARTICLES
Filed Feb. 3, 1934 4 Sheets—Sheet 4
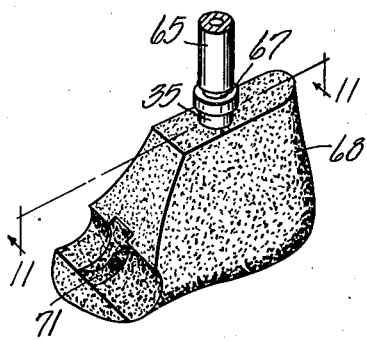
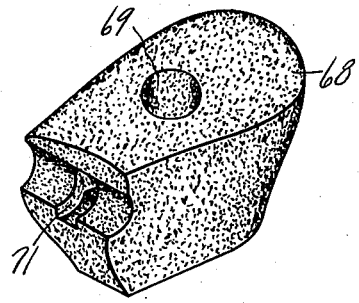
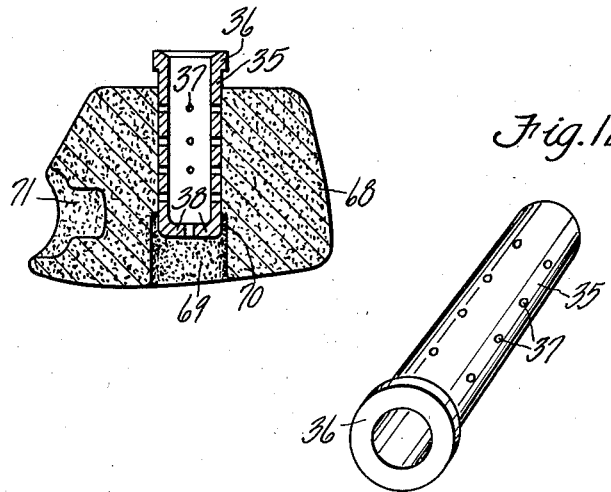
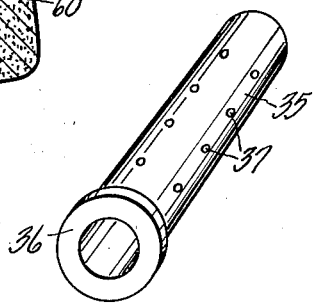
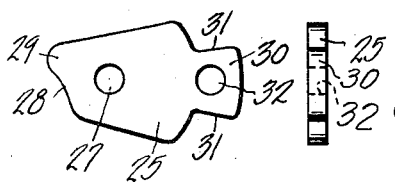
INVENTOR.
George C. Clark.
BY
ATTORNEY.

Patented Mar. 19, 1935

1,994,570

UNITED STATES PATENT OFFICE 1,994,570

APPARATUS FOR MOLDING HOLLOW METAL ARTICLES

George C. Clark, Beverly Hills, Calif.

Application February 3, 1934, Serial No. 709,585

11 Claims. (Cl. 22—126)

The invention relates to apparatus for molding hollow metal articles, and particularly for molding hollow metal articulated shoe lasts for use in the manufacture of leather footwear.

The hollow metal lasts to be molded are preferably formed of aluminum and are used on shoe making machines which subject them to heavy pressure. These lasts are provided with a spring controlled hinge, one member of which is a plate carried by one of the last parts. This plate must be precisely positioned relative to the joint face of the last member to receive the hinge pintle and to permit a cam face on its edge to cooperate with a spring pressed ball mounted in a recess in the other last part. The lasts for this purpose and of this construction, i. e. hinged lasts, heretofore found practicable have largely been made of wood, due to certain disadvantages of metal lasts as heretofore constructed, and also due to the higher cost of metal lasts.

It is therefore the primary object of the invention to provide means for molding a hollow metal article which will withstand the application of great force thereto.

A further object is to provide means for imbedding and molding into a hollow metal article, in the operation of molding the same, a sleeve formed of a metal having a higher tensile strength and greater hardness than the metal of which the article is formed and adapted to fit on a work holder intended to support the hollow metal article.

A further object is to provide means by which a metal sleeve to be imbedded in a hollow metal article may be operatively held and precisely positioned relative to a mold impression during the molding operation.

A further object is to provide a sand core for a hollow metal article, which is to be disposed in a suitable molding flask in the impression thereof, with a metal sleeve to be imbedded in the article in the molding operation.

A further object is to provide means by which a hollow metal last may be inexpensively manufactured.

A further object is to provide means by which a hollow metal article may be molded with a preformed metal sleeve imbedded therein and supported at its inner end by an inwardly directed enlargement of said article.

A further object is to provide a molding apparatus with a chill construction in which the chill is fashioned to receive and support, during the molding operation, a separate metal hinge lock plate in part imbedded by the molten metal in exact position with respect to its required operative relation with the other last part forming the articulated last.

A further object is to provide a chill with a recessed portion for receiving a hinge lock plate and a pin for holding said plate in operative relation in said recess.

A further object is to provide a molding flask having a mold impression formed in part by a chill and receiving a core having a recess formed therein, said chill mounting and operatively positioning a hinge lock plate projecting into said core recess to form a mold encasing the part of the lock plate extending within the outline thereof.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side view of a hollow metal articulated last, with a part thereof illustrated in longitudinal vertical section taken on line 1—1 of Figure 2.

Figure 2 is a view in front elevation of the heel member of an articulated last.

Figure 3 is a longitudinal vertical sectional view of the heel of a last taken on line 3—3 of Figure 2.

Figure 4 is a fragmentary top plan view of the drag, core and core supporting means of the molding apparatus.

Figure 5 is a fragmentary perspective view of the drag of a molding flask.

Figure 6 is a fragmentary perspective view of a molding flask operatively set up.

Figure 7 is a top front perspective view of a chill carried by the molding apparatus.

Figure 8 is a rear bottom perspective view of the chill illustrated in Figure 7.

Figure 9 is a top front perspective view of a core of the molding apparatus.

Figure 10 is a bottom front perspective view of the core shown in Figure 9.

Figure 11 is a longitudinal vertical sectional view of the core taken on line 11—11 of Figure 9.

Figure 12 is a perspective view of the metal sleeve employed with the molding apparatus.

Figures 13 and 14 illustrate, in plan and end elevation, respectively, the hinge lock plate to be imbedded in the hollow metal article to be molded.

Referring to the drawings, which illustrate the preferred embodiment of the invention, Figures 1 to 3 illustrate a shoe last 20 to be cast in the molding apparatus which forms the subject matter of the invention. The shoe last is formed of a toe member 21 and a heel member 22. The toe member 21 has a transverse joint knuckle 23 of arcuate section formed therein which fits into a transverse joint socket 24 of arcuate section formed in the joint face of the heel member 22. A hinge lock plate 25 is partially imbedded in the heel member 22 and projects longitudinally forwardly from the joint face thereof and into a kerf formed in the toe member 21 at its joint face, as fully set forth and described in my copending application, Serial No. 709,586, filed February 3, 1934. A pivot pin 26 extends longitudinally and centrally through knuckle 23 of the heel member and passes through an aperture 27 in hinge lock plate 25 to pivotally interconnect the last parts. The last members are both formed of hollow aluminum, or other desired and suitable material, and an inwardly longitudinally extending tubular pocket is formed in toe member 21 and opens at the joint face thereof. In this pocket is mounted a coil spring and ball, said spring urging said ball against the end edge of the lock plate. The construction of the toe member and the arrangement of the parts therein are all described in my above mentioned copending application. Lock plate 25 tapers toward its projecting end and is shaped to provide a lower concave face 28 and an upper projection 29 of convex form, the ball carried by said toe member being always spring urged to off-center relation with said projection 29. The end of said plate 25 opposite cam projection 29 is provided with a narrow projecting portion 30 whose opposite sides 31 taper toward plate aperture 27, and said portion 30 has an aperture 32 formed therein. The heel portion 22 of the last is provided with an inwardly projecting portion 33 which completely encases the portion of plate 25 extending into said last member, the tapered sides of said plate and the metal of the last which lodges in plate aperture 32 serving to solidly and securely anchor the plate 25 in heel member 22. The last is thus constructed similarly, with respect to the articulated connection of the parts thereof, to conventional articulated lasts for use in the manufacture of leather footwear; the spring depressed ball engaging edge 28 of plate 25 to lock the last in normal position as illustrated in Figure 1, but being shiftable to pass over cam projection 29 and into engagement with the upper face of said plate 25 when the last parts are pivoted to thereby hold the same at the extreme limits of the pivotal movement, and to prevent free pivotal movement of the parts between their extremes of pivotal movement.

The heel member 22 of the last is also provided with a sleeve 35 imbedded therein and preferably formed of iron or some other metal having greater tensile strength and greater hardness than the aluminum of which said heel member is preferably formed. Sleeve 35 is provided with an enlarged neck or collar 36 adjacent its open outer end, and this collar 36 is disposed between the inner and outer faces of the metal of the last in which it is imbedded to effectively lock said sleeve to place. A plurality of apertures 37 are formed in the sleeve in spaced relation throughout its length for the purpose of permitting escape of gases generated in the casting operation, and the sleeve is provided with an inwardly directed flange 38 at its inner end. The sleeve extends perpendicularly centrally from the top face of heel member 22 and is open at its upper end. The sleeve 35 terminates at its inner end in spaced relation to the sole or tread portion of the heel member 22 and abuts upon and is encompassed at its inner end by an enlargement or bearing member 39 formed integrally with and projecting inwardly of said tread portion in axial alignment with said sleeve 35.

The apparatus which forms the subject matter of the invention is designed particularly for casting or molding the heel member 22. The apparatus comprises a molding flask 45 formed of a drag 46 and a cope 47 which are mounted in registering relation governed by projecting ears 48 which carry suitable means, as a pin and aperture, for effecting the registration. Each of the flask members is filled with sand and mounts a section of a chill 49 formed of cast iron or other suitable material. The chill sections 49 are each provided with a contacting face 50 which lies flush with the contacting edge of the flask member in which it is mounted, and with a face 51 extending perpendicularly to face 50 and comprising a central enlarged portion 52 recessed to fixedly mount a projecting plug 53 of arcuate cross section. Plane portions 54 extend relatively angularly from plug 53. The chills are imbedded in the sand of the flask members, as are also bolts 55 carried by each chill section, the packed sand serving to support the chills as desired. The faces 50 of the chill sections and the end faces of plugs 53 are each provided with, i. e. have formed therein, a recess 57 which has a depth equal to one-half the thickness of hinge plate 25 and is of an outline corresponding to the shape of the portion of said plate 25 which projects from said heel part of the last, as illustrated in Figure 3. This recess 57 is properly positioned to provide exact and correct relationship between hinge plate 25 and the recessed joint face of the heel member of the last. A stud 58 is carried by the end of plug 53 and projects into recess 57 to permit the aperture 27 of said hinge plate 25 to fit thereover to positively position said plate against movement in said recess 57. Complementary portions 60 of the mold impression are formed in the sand of the drag and cope to expose a portion of the faces 54 of said chills against which the joint face of the article to be molded is cast, as fully set forth and described in my above mentioned copending application.

The drag 46 of the molding flask has an elongated rib 61 formed in the two outer longitudinal sides thereof in spaced relation to the upper edge therefor and these ribs mount a core supporting frame 62 which is provided with a plurality of spaced projections 63 bearing on the sides of the drag and serving to exactly position said frame relative to the flask as set out in my Patent No. 1,210,421. A clamp 64 is carried by the frame 62 for engagement with an arbor 65 which extends into the molding flask through the registering semi-circular recesses 66 formed in the drag and cope, said arbor extending into mold impression 60 at its inner end 67 which is preferably formed of reduced size as illustrated in Figure 4.

A sand core 68, having the metal sleeve 35 imbedded therein, is supported on reduced end 67 of arbor 65 to support said core 68 in operative positively positioned relation to mold impression 60. One end of sleeve 35 projects from core 68 to space collar 36 from said core. A recess 69 is formed in core 68 in coaxial relation to sleeve 35 and provides an opening around the inner end of said sleeve at 70. A configured recess 71 is formed in the front portion of core 68 to form a mold for the last portion 33 which encases hinge plate 25. A pouring hole 72 and a vent hole 73 are formed in the cope in communication with mold impression 60.

The use of the apparatus is as follows: The mold impression 60 is formed in the sand of the cope and drag in any usual manner and in proper relation to the chill sections 49. The core supporting frame 62 is then mounted on the drag ribs 61 with bearing members 63 engaging the sides of the drag to precisely position said frame and arbor 65 relative to the drag. The core 68 provided with imbedded sleeve 35 and with the recesses as described is then positioned in the mold impression 60, the sleeve 35 thereof being mounted on the reduced end 67 of said arbor. The hinge plate 25 is then mounted in the recess 56 formed in the chill sections of the drag to project into recess 71 of core 68 with the stud 58 passing through plate aperture 27 to fixedly hold said plate in proper position in said recess. The cope 47 is then positioned on the drag in exact registering relation thereto. Molten metal may then be poured through opening 72.

The molten metal fills the space between the mold impression 60 and the core 68 to form the outline of the article to be molded, and passes into and fills the recesses 69 and 70 and also fills the space between recess 71 and plate 25 with a portion thereof lodging in plate aperture 32 to positively anchor said plate in the molded article. The projecting portion of sleeve 35, and particularly collar 36, is thus imbedded in the molded article at the upper side thereof, said core arbor 65 closing the end of said sleeve to prevent the molten metal from passing therein. The opposite end of sleeve 35 is encompassed at its inner end by the metal poured into recess 70 and abuts the enlargement 39 formed by metal poured into recess 69 of the core. Upon removal of core arbor 65 from sleeve 35, the sand of which core 68 is formed, having been dried and decomposed from its core form by the heat of the molding operation, may be poured through knock-out openings 37ª in the molded article to empty the molded article thereof. Thus, when the molding operation has been completed, a molded article complete except for the finishing of the surfaces thereof which are cast against the sand of the mold impression 60, has been formed in a single operation with both the hinge plate 25 and sleeve 35 imbedded and securely anchored therein in their precise required relation.

The invention having been set forth, what is claimed as new and useful is:

1. In a molding apparatus, a molding flask having a mold impression formed therein, a core mounted in said impression and having an opening therethrough, and a metal tubular member mounted in said opening to project therefrom at one end and having its opposite end spaced inwardly of the face of said core, the last named end of said member being provided with an inwardly directed flange closing at least the major portion thereof, the portion of said core opening adjacent the flanged end of said tubular member forming a mold by which an inwardly extending member abutting said flanged end is provided in the article to be molded.

2. A molding apparatus for molding a hollow metal shoe last, comprising a molding flask having a mold impression formed therein, core supporting means including an arbor projecting into said impression, a core having an opening therethrough, and a metal sleeve to be imbedded in the shoe last mounted in and extending partially through said opening, said sleeve fitting on said arbor, the portion of said opening adjacent the end of said sleeve terminating within the core forming a mold for a projection in the article to be molded abutting the inner end of said sleeve.

3. A molding apparatus for molding a hollow metal shoe last, comprising a molding flask, said flask having a mold impression formed therein, a core, a metal sleeve imbedded in and extending partially through said core, said core having an opening therein aligned with said sleeve and of greater transverse dimension than said sleeve, the end of said sleeve terminating in said core projecting into said opening, means engaging said sleeve for supporting said core in said impression, said opening forming a mold for a projection in the article to be molded abutting and encompassing the inner end of said sleeve.

4. The combination with a two-part flask having a mold impression for molding an article with a preformed member partially imbedded therein and having an exposed aperture, of a two-part chill forming a face of said impression, one part of said chill being carried by each of said flask parts, the contacting faces of said chill parts each having a recess formed therein, said recesses registering to form a pocket to receive said member, and a stud carried by one of said chill parts and projecting into said pocket and the aperture of said preformed member.

5. The combination with a two-part flask having a mold impression for molding an article with a preformed member partially imbedded therein and having an opening therein, of a two-part chill forming a face of said impression, one part of said chill being carried by each of said flask parts, said chill parts having configured registering recesses formed in the contacting faces thereof to operatively position said preformed member, and a stud carried by one chill part and projecting into said recess and the opening of said member.

6. The combination with a flask having a mold impression therein for molding a section of an articulated hollow shoe last with a preformed hinge member partially imbedded therein, a core disposed in said mold impression and having a recess formed therein, of a chill carried by said flask, and means carried by said chill for positioning said preformed hinge member to project into said impression and into said core recess in spaced relation to the walls thereof, whereby the imbedded portion of said preformed hinge member is encased in an interior projection of the shoe last for which said core recess forms a mold.

7. The combination with a flask having a mold impression for molding a section of an articulated hollow shoe last with an apertured preformed hinge member partially imbedded therein, a core disposed in said impression and having a recess formed therein, of a chill carried by said flask and forming part of said impression, and means carried by said chill for positioning said preformed hinge member with the apertured portion thereof projecting into said core recess in spaced relation to the walls thereof to be encased in an interior projection of said shoe last molded by said core recess with the aperture of said preformed member filled with molded metal to lock said member to the shoe last section molded.

8. The combination with a molding flask filled with formable material having a mold impression formed therein, a core disposed in said impression and having a recess formed therein, said impression and core molding a section of an articulated hollow metal shoe last with a hinge part partially imbedded therein, of a metal member fixedly carried by said flask, and means carried by said last named member adjacent said impression for precisely positioning said hinge part with the portion thereof to be imbedded projecting into said core recess in spaced relation to the walls thereof to be encased in a portion of said shoe last section molded in said core recess.

9. In an apparatus for molding a hollow shoe last part having a sleeve imbedded therein, comprising a flask having a mold impression, core supporting means including a hollow arbor, and a core, said sleeve being partially imbedded in said core and fitting on said arbor, said sleeve and arbor cooperating to hold said core in normally fixed relation to said arbor and to vent gases generated in the core in the casting operation, said core being non-symmetrical relative to the axis of said arbor, and means for fixedly mounting said arbor with relation to said flask, said sleeve being readily separable from said arbor.

10. The combination with a two-part flask having a mold impression for molding an article with a pre-formed hinge member partially embedded therein and having an exposed aperture, of a two-part chill forming the face of said impression, one part of said chill being carried by each of said flask parts, the parting face of one of said chill parts having a recess formed therein, to form a pocket to receive said member, and means carried by one of said chills for locking said pre-formed hinge member in operative relation during the casting operation.

11. The combination with a two-part flask having a mold impression for molding an article with a pre-formed hinge member partially imbedded therein to project therefrom, of a two-part chill forming a face of said impression, one part of said chill being carried by each of said flask parts, the parting face of one of said chill parts having a recess formed therein to form a pocket to receive said member, said pre-formed hinged member being operatively positioned between said chills during the casting operation.

GEORGE C. CLARK.